(No Model.)
T. W. MEACHEM.
BILLIARD TABLE CUSHION.
No. 593,327. Patented Nov. 9, 1897.
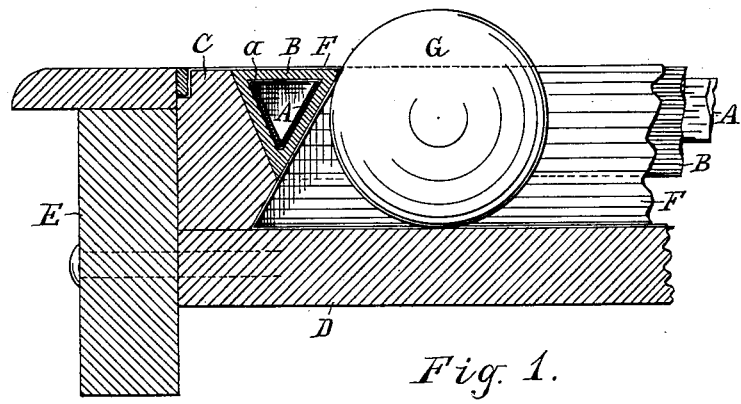
Fig. 1.
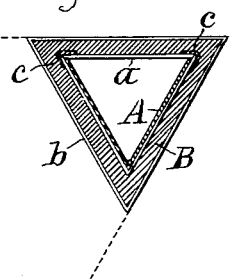
Fig. 2.
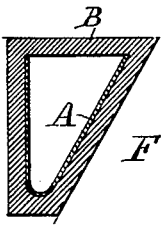
Fig. 3.
Fig. 4.
Witnesses.
Fig. 5.
Inventor.
Thomas W. Meachem
By C. H. Duell
his Attorney.

United States Patent Office.

THOMAS W. MEACHEM, OF SYRACUSE, NEW YORK.

BILLIARD-TABLE CUSHION.

SPECIFICATION forming part of Letters Patent No. 593,327, dated November 9, 1897.

Application filed September 24, 1896. Serial No. 606,852. (No model.)

*To all whom it may concern:*

Be it known that I, THOMAS W. MEACHEM, of Syracuse, in the county of Onondaga, in the State of New York, have invented new and useful Improvements in Billiard-Table Cushions, of which the following, taken in connection with the accompanying drawings, is a full, clear, and exact description.

My invention relates to cushions for billiard-tables; and the object is to provide a cushion that will be permanently elastic and maintain substantially the same elasticity whether in a humid or dry atmosphere and at the same time possess great durability.

To this end my invention consists in the combination of a rubber cushion and a V or U shaped metallic spring completely inclosed therein, said rubber cushion being secured to the cushion-rail of a billiard-table; and my invention consists in certain other combinations of parts hereinafter described, and specifically set forth in the claims.

In the drawings hereto annexed and forming a part of this specification, Figure 1 is a sectional view of a portion of a billiard-table embodying my invention. Figs. 2 and 3 are modified forms of my improved cushions removed from the table. Fig. 4 is a perspective view of a portion of the metallic V-shaped spring removed from the rubber cushion, and Fig. 5 is an end view of a modified form of spring.

Referring specifically to the drawings, A represents the metallic U or V shaped metal spring, which may be formed of steel or other suitable metal and which extends continuously or in suitable lengths within the rubber cushion on each of the sides of the table, and B is the rubber cushion which surrounds and completely incloses the spring. The rubber cushion B is preferably substantially triangular-shaped in cross-section and is secured by cement or other suitable and well-known means to the cushion-strip C, surrounding the table.

It will be obvious that the rubber cushion may be shaped otherwise than triangular in cross-section—as, for instance, like that shown in Fig. 3, which has four flat sides, the one for attachment to the cushion-rail being vertical. In every case, however, the spring is completely inclosed by the rubber cushion— that is, the rubber extends between the open side or separated edges of the spring as well as on the other sides thereof.

As indicated in Figs. 1 and 2 of the drawings by the reference-letter *a*, I prefer to line or cover the rubber cushion on the inner walls with cloth or other suitable fabric, which is cemented to the rubber, and in some cases to cover the rubber with cloth *b* on its exterior surface, as indicated in Fig. 2 of the drawings. The cloth strengthens the rubber and affords better means for securing the cushion to the cushion-rail with glue or other cement.

In order to still further strengthen or stiffen the rubber, I may employ plain or angular strips *c* of hard rubber in one or both of the upper corners of the rubber cushion. When such strips are used, they are embedded in the rubber, as shown by broken lines *c c* in Fig. 2 of the drawings. The cross-section of the spring is varied in shape, depending upon the shape of the cushion, but is in every case substantially V or U shaped.

In order to stiffen the edges of the spring, said edges may be turned over more or less, as indicated in Fig. 5 of the drawings, in which case they are turned inward toward each other.

In Fig. 1, D represents the bed of the table, and E the framework secured to the bed, to which framework the cushion-strip for the rubber cushion is attached. F indicates the cloth covering the cushion-strip and cushions in the usual manner, and G represents a ball on the bed in contact with the cushion.

Having described my invention, what I claim as new, and desire to secure by Letters Patent, is—

1. The combination of a V or U shaped metallic spring and a rubber cushion completely inclosing the spring, as set forth.

2. The combination of a V or U shaped metallic spring and a triangular rubber cushion completely inclosing the spring, as set forth.

3. The combination of a V or U shaped metallic spring, a rubber cushion completely inclosing the spring, and a fabric cemented to the rubber on the interior walls of the cushion, as set forth.

4. The combination of a V or U shaped metallic spring, a rubber cushion shaped triangular in cross-section, entirely surrounding the spring, and cloth between the rubber and the spring, as set forth.

5. The combination of a V or U shaped metallic spring, an angular rubber cushion completely inclosing the spring, cloth secured to the interior of the cushion and cloth completely inclosing the cushion, as set forth.

6. The combination of a V or U shaped metallic spring, an angular rubber cushion completely inclosing the spring, cloth secured to the inner walls of the cushion, and stiffening-strips at one or more of the angles of the cushion embedded in the rubber substantially as described and shown.

7. The combination of a V or U shaped metallic spring having its edges bent inward, and an angular rubber cushion completely inclosing the spring, as set forth.

8. The combination of a V or U shaped metallic spring, an angular rubber cushion completely inclosing the spring, cloth secured to the inner walls of the cushion, and a cushion-rail surrounding a billiard-table to support the cushion, substantially as described and shown.

In testimony whereof I have hereunto signed my name.

THOMAS W. MEACHEM. [L. S.]

Witnesses:
MARK W. DEWEY,
H. M. SEAMANS.